United States Patent [19]

Kornylak

[11] 3,805,064

[45] Apr. 16, 1974

[54] RADIATION SENSITIVE INTRUSION DETECTION SYSTEM

[75] Inventor: Andrew To Kornylak, Hamilton, Ohio

[73] Assignee: Kornylak Corporation, Hamilton, Ohio

[22] Filed: Apr. 27, 1972

[21] Appl. No.: 248,337

[52] U.S. Cl. ............... 250/221, 250/211, 340/258 B
[51] Int. Cl. ............................................ G08b 13/00
[58] Field of Search ............ 250/221, 222 R, 211 R, 250/233; 340/258 R, 258 B

[56] References Cited
UNITED STATES PATENTS

| | | |
|---|---|---|
| 3,235,738 | 2/1966 | Kress et al. ......................... 250/221 |
| 3,545,572 | 12/1970 | Hallene et al. ................... 250/221 X |
| 3,336,585 | 8/1967 | Macovski ............................ 340/258 |
| 3,335,285 | 8/1967 | Gally, Jr. et al. ..................... 250/221 |
| 2,769,374 | 11/1956 | Sick .................................... 250/221 |
| 2,419,459 | 4/1947 | McDowell et al. ................. 250/221 |

Primary Examiner—Walter Stolwein

[57] ABSTRACT

The disclosure relates to devices to detect intrusion of a small mass into a doorway or the like. Detection is caused by interruption of a rapidly scanning or other appropriate light beam or radiation source which impinges upon a photovoltaic or photoconductive tape fastened to the perimeter of the doorway. Interruption of the light beam or its equivalent causes a momentary reduction in current or voltage emitted by the tape.

6 Claims, 6 Drawing Figures

RADIATION SENSITIVE INTRUSION DETECTION SYSTEM

The present invention relates to devices and apparatus for improved detection of masses entering into a doorway or the like and, more particularly, to such apparatus which embodies the use of a photovoltaic or photoconductive tape.

Although the use of light sensitive means for intrusion detection is known in the art the systems and apparatus to date are devoid of any disclosure of light sensitive tape means fastened to the perimeter of a doorway or the like. The advantage of this latter improvement of the prior art is that smaller masses may be detected with the tape system of the present invention than can be detected by presently known apparatus and systems.

Another advantage of the present invention is that the sensitive tape means as used herein is relatively unobtrusive and yet leaves no blind spots for the intrusion of undetected masses.

Further advantages and objects of the invention will become apparent from reference to the following description taken together with the accompanying drawing, in which.

Figures 1, 2:
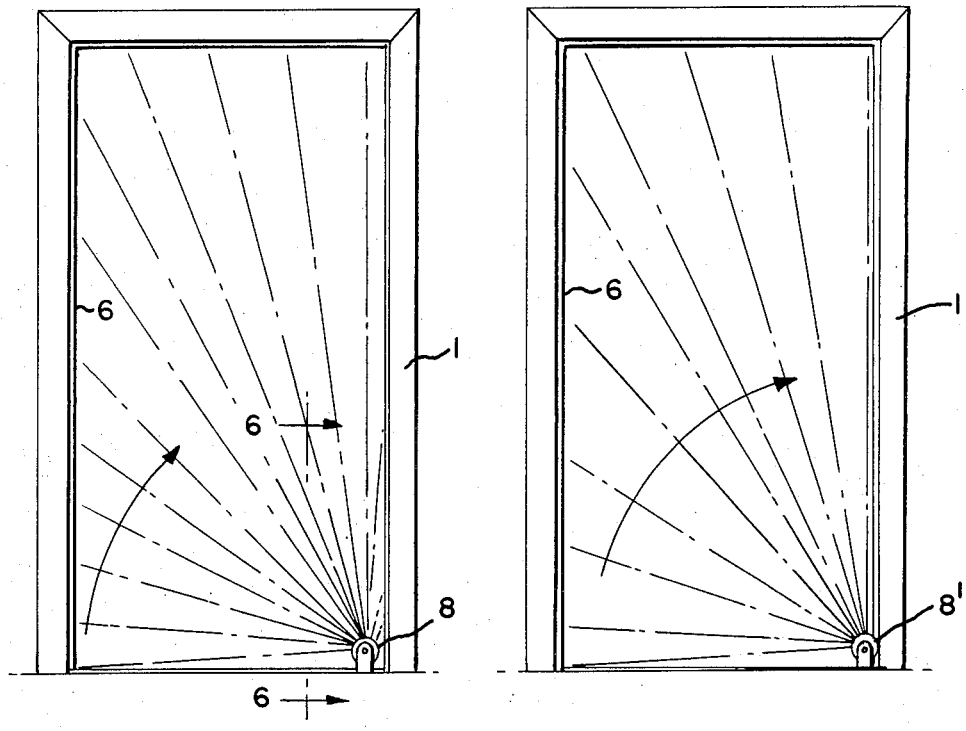
FIG. 1 is a view of a doorway containing the radiation sensitive tape and scanning beam of the present invention, wherein the tape is applied to three sides of the doorway.
FIG. 2 is a modification wherein the tape is applied to but two sides of the doorway.

Referring to FIG. 1, there is shown a doorway 1 having affixed to three sides of the perimeter thereof a radiation sensitive tape 6. Adjacent one corner of the doorway there is mounted, as unobtrusively as possible, a radiation scanning means 8. This scanning means may take the form disclosed in FIG. 4, wherein a radiation source 7 such as light or its equivalent is surrounded by a rotating shield 9 having two diametrically opposed slits 10 therein to generate scanning beams 11. The generated beams are preferably of ribbon cross-section whose dimensions are very small in the direction of scanning but broad enough to overlap the full width of the tape 6.

Figure 4:
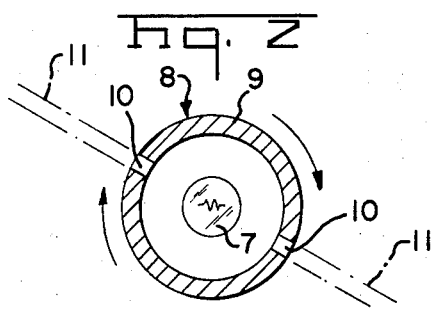
FIGS. 4 and 5 show two forms of rotating or revolving shields used to generate scanning beams.
Figure 5:
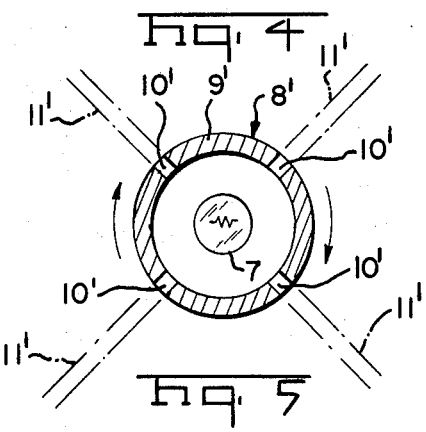

Referring to FIG. 2 it is apparent that only two sides of doorway perimeter 1 have affixed thereto the radiation sensitive tape 6. The scanning means 8' for this type of installation should preferably be of the revolving shield type disclosed in FIG. 5. In this figure it is to be noted that the revolving shield 9' has four slits 10' spaced 90° apart in order to provide four scanning beams 11' with each revolution. It should be noted that the scanners of FIGS. 4 and 5 are shown symbollically since many different scanners could be employed. For example, the scanner could comprise rotating prisms, an oscillating or rotating mirror, a vibrating mirror or prism, a rotatable light source or other well known scanning devices.

Figure 3:
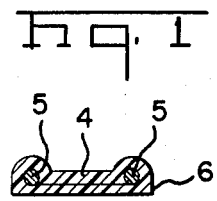
FIG. 3 is a cross-section of the radiation sensitive tape.

One form of radiation sensitive tape usable in the present invention may be seen in cross-sectional form in FIG. 3. Element 4 is the sensitive strip of the sulfur or selenium type or equivalent thereof. Examples of such materials are disclosed in U.S. Pat. No. 3,148,084 and No. 3,377,200. The strip 4 is embedded in a radiation transparent cover 6 and is provided with a pair of longitudinally extending metallic leads 5. While in use these leads are connected to an appropriate indicating means (not shown). In one form of indicating means a sensitive galvanometer such as used in light measuring photometers may be used. The current variations could also be fed to amplifying means to operate relay systems controlling some forms of alarms.

Figure 6:
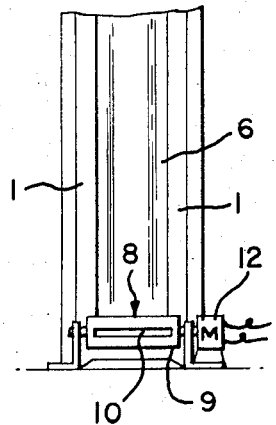
FIG. 6 is a view taken along the line 6—6 of FIG. 1.

The system is shown in more detail in FIG. 6 wherein the scanner 8 includes a motor 12 which rotates the revolving shield 9 having slits 10 therein through which the scanning beams 11 emanate. The scanning beams scan over the radiation sensitive tape 6 in the doorway 1. Since the tape 6 is narrow, the scanning beams 11 can also be narrow or wide enough to extend across the entire width of the tape and thereby be unobtrusive. It can be seen that any object entering the scanning path which is as wide as the tape 6 will cause a break in the path between the scanning beam and the tape, thereby providing an indication of this event. It is to be noted that one of the scanning beams is at all times directed at the tape so that the beam impingement on the tape is broken only by an object being interposed in the scanning path.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A space intrusion detecting system comprising
a source of electromagnetic radiations,
an elongated ribbon-like strip which is sensitive along substantially its entire length to said radiations, spaced from the source and extending along the boundary of the space into which intrusion is to be detected,
means for movably scanning said strip along its length with a beam of said electromagnetic radiations, said beam having a dimension along the length of the strip which is a small fraction thereof,
means controlled by said strip upon sensing interruption of said beam for providing an indication,
said strip comprising at least a pair of laterally spaced conductors with photosensitive material between them,
and said photosensitive strip providing an electrical output of a first substantially constant value when scanned by the uninterrupted beam and an electrical output of a second substantially constant value upon interruption of the beam.

2. A system according to claim 1 wherein said means for continuously scanning said strip provides a plurality of beams so spaced as to cause infringement of one beam on the strip as a second beam leaves said strip.

3. A system according to claim 2 wherein the beams extend across substantially the width of the strip.

4. A system according to claim 1 wherein said radiations are in the light range.

5. A system according to claim 4 wherein said strip produces a photovoltaic output.

6. A system according to claim 4 wherein said strip is photoresistive.

* * * * *